Feb. 10, 1953 P. N. SMITH 2,627,660
LIQUID DEPTH MEASURING DEVICE
Filed Feb. 27, 1950 2 SHEETS—SHEET 1

INVENTOR.
Philip N. Smith
BY Ezekiel Wolf
his attorney.

Feb. 10, 1953        P. N. SMITH        2,627,660

LIQUID DEPTH MEASURING DEVICE

Filed Feb. 27, 1950        2 SHEETS—SHEET 2

INVENTOR.
Philip N. Smith
BY
Ezekiel Wolf
his Attorney

Patented Feb. 10, 1953

2,627,660

UNITED STATES PATENT OFFICE 2,627,660

LIQUID DEPTH MEASURING DEVICE

Philip N. Smith, Warwick, R. I.

Application February 27, 1950, Serial No. 146,480

15 Claims. (Cl. 33—126.6)

The present invention relates to a system and method for measuring the depth of liquid or fluid in a tank from a remote point and also to the measurement of other factors necessary and desirable for keeping accurate record of volume and temperature in storage tanks. The method and system of the present invention are particularly desirable in large tank farms where a great number of very large tanks are spread over a considerable area and it is desirable to know at a control point, such as the central office, pump control source, or other places what the inventory of oil is and whether the tanks are at a safe temperature.

The system of the present invention utilizes only two wires, a signal wire and a ground line which may be a line common to all the tanks so that in the case of a farm system having fifty storage tanks only fifty-one leads are necessary. The system permits an operator to measure the depth of oil in a tank with great accuracy, for instance to the nearest tenth of an inch or even less and at the same time to make a measurement of the temperature in each tank in which the amount of oil is measured. Besides measuring tank temperatures, temperatures in the vicinity of the tank may also be measured and the average temperature derived from a multiplicity of temperature sensing elements placed at desired points around the tank may also be made.

The same system which measures the depth of oil or fluid in the tank may also be used to measure the distance from the top or a fixed point in the tank to the oil or fluid level.

Without further describing the merits and advantages of the present invention, the invention will be described with reference to the drawings forming a part hereof in which.

Figure 1:
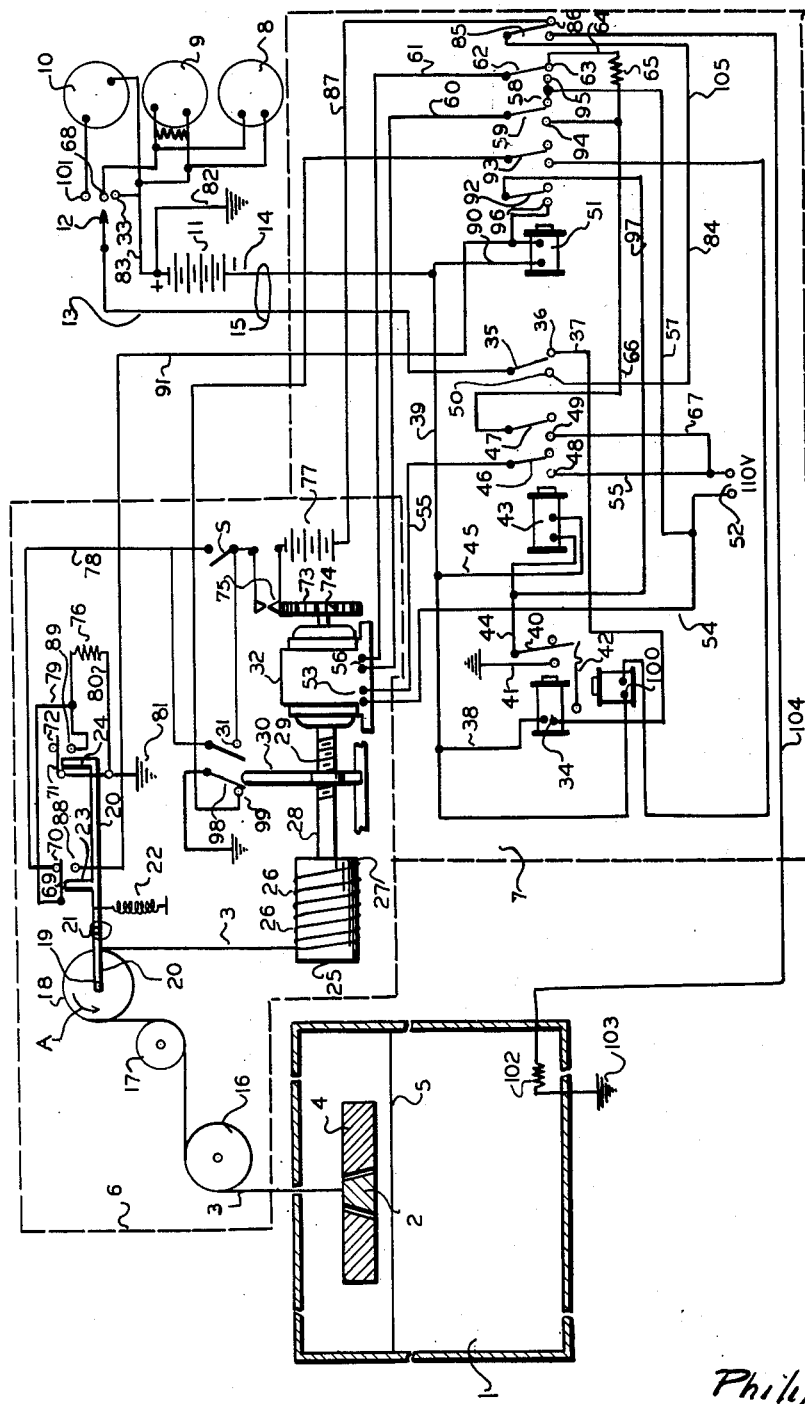
Figure 1 shows a diagrammatic lay-out of the system.

In the arrangement indicated in the drawings, I shows a storage tank in which is suspended a weight 2, by means of a line or cable 3, the weight carrying freely the float 4, such that when the float reaches the liquid level 5, it will be free of the weight 2 and the weight alone will continue to go through the liquid as it is lowered to the bottom of the tank. The weight raising and lowering unit designated within the dotted line 6 is mounted on the top of the tank and so also the control unit designated within the dotted line 7. At the indicating station are positioned various indicators including an auxiliary counter 8, a depth counter 9, a temperature indicator 10, preferably a self-balancing resistance bridge for reading temperature, a common battery 11 and a control switch 12. Two wires go to the tank, one designated by the lead 13 and the other by the common line 14. Both of these lines may be included in a single cable indicated by the loop 15. The arrangement indicated in Figure 1 shows a system for only one of the tanks where a number of tanks are employed. The cable 15, Figure 3, includes the same common line 14, plus a lead 13, 13, etc., for each tank.

In the arrangement shown in Figure 1, the line 3 is passed over a number of pulleys 16 and 17 to a pulley 18 pivoted at one end 19 of a lever 20 which is pivoted and supported at a pivot 21. On the other side of the lever 20, there is attached a counterweight spring 22 as well as switch control arms 23 and 24. The line 3 which is conducted over the pulley 18 is brought down to a drum 25 on which the line is wound in successive turns as indicated at 26, 26, etc., with the end of the line attached to the drum at 27. The line is of such a length that before it is entirely unwound on the drum, the weight 2 will have reached the bottom of the tank. The drum 25 is rotated by means of a shaft 28 and is threaded in the section 29 to accommodate a similarly threaded arm 30 operating the limit switch 98 to stop the drive of the motor 32 when the measuring cycle has been completed.

It may be assumed that the weight 2 carrying the float 4 initially is at the top of the tank when the arm 30 closes the limit switch 98 and shuts down the motor 32 as will be explained later. In this position the operation for measuring the distance to the liquid level and also the distance from the liquid level to the bottom of the tank is commenced by momentarily closing the switch arm 12 to the contact 33. This momentary closing will energize the relay coil 34 by means of the battery 11 over the following circuit: From the switch arm 12, the lead 13, the contact arm 35, the contact 36, the line 37, the relay 34, the line 38, the line 39 to the line 14, connecting to the negative side of the battery 11. The energizing of the coil 34 will draw over the contact arm 40 to the position of the ground connection 41, locking the arm 40 in position by means of the spring arm 42. The relay coil 43 is thereby energized through the ground connection 41, the switch arm 42, the line 44, the relay 43, the line 45, the line 39 to the line 14 connecting to the negative side of the battery 11.

The relay 43 operates the spring tensional switch arms 46, 47 and 35, swinging all of these contact arms to the left to make contact with the contacts 48, 49 and 50. It may be noted that the normal position of all of the contact arms related with the relays 34, 43 and 51, are to the right and for this purpose a spring may maintain these contacts in such a position as is common practice in relay switch construction. Operation of the relay 43 completes the circuit to the 110 volt supply source 52 for supplying energy to the motor field terminals 53. This circuit may be traced from the supply source 52 over the line 54 to the motor field, returning through the line 55, the switch arm 46, the contact 48, to the lead 55, back to the supply source 52. The supply of energy to the armature terminals 56 is also closed at this time and this circuit may be traced as follows: From the supply source 52 over the line 57 to the contact 58 through the arm 59 over the line 60 to the armature terminal 56, through the armature to the other terminal 56, over the line 61 to the contact arm 62, the contact 63, the line 64, the low resistance 65, the line 66, the contact arm 47, the contact 49 and the line 67 to the other side of the supply source 52. Since the motor circuit is completed to the motor by the momentary closing of the arm 12 to the contact 35, the motor 32 will commence to turn to lower the weight and float to the liquid. After momentarily placing the switch arm 12 on the contact 33, it should be put in position in contact with the contact 68 which connects the system at the observing station to both the auxiliary counter 8 and the depth impulse counter 9, so that immediately upon the operation of the motor these counters will be operated by the motor operation to indicate the distance from the initial position of the weight and float to the top of the liquid and the distance from the top of the liquid to the bottom of the tank.

The lever arm 20 in the initial descent of the float and counterweight, maintains the vertical arms 23 and 24 in a position forcing the contact arm 69 against the contact 70 and the contact arm 71 against the contact 72. In this position when the weight and float are at the top, the tension on the pulley 18 is a maximum and in the direction of the arrow A. A circuit is completed through the impulse counter generator wheel 73 which is mounted on the shaft of the motor 32. This impulse counter wheel is provided with spaced projections 74 operating to close the contact 75 as each projection 74 comes against the contacts. These impulses begin to register, with the turning of the motor and the lowering of the float and weight in the tank, upon the auxiliary counter 8, but not upon the depth counter 9 because of the shunting resistance 76 which reduces the output so that only the auxiliary counter 8 but not the depth counter will operate. For this purpose, the auxiliary counter may be one which will operate on a magnitude of five volts, whereas the depth impulse counter needs at least 25 volts for operation. The circuit for operating the auxiliary counter may be traced as follows: Commencing at the energizing source which is the battery 77, the circuit may be traced through the contact 75, the line 78, with S closed, the contact 79, the contact arm 69, the line 79, the resistance 76, the line 80 to the ground 81 through the ground connection 82 at the receiving position, the line 83 which is common to all of the indicators 8, 9, and 10 and back through the contact 68, the switch arm 12, the line 13, the contact arm 35, the contact 50, the line 84, the switch arm 85, the contact 86 and the line 87, back to the battery 77. The impulses will be clocked off by the impulse counter arm 73 recording the number of impulses and therefore the distance on the counter 8 as the float and weight are lowered from their initial position to their instantaneous position during the lowering. Since the depth impulse counter will not operate except upon a higher voltage, no recording will be made on the depth impulse counter until the resistance 76 has been cut out of circuit. This occurs when the float 4 comes to rest on the liquid 5. At this position the tension on the pulley 18 will be released to the extent of the weight of the float 4 permitting the spring 22 to pull down the lever arm 20 until the arm 71 makes contact with the contact 89 which will cut out the resistance 76 and apply the full potential of the battery 77 between the lead 83 and the lead 13. The depth counter will then begin to operate while the auxiliary counter 8 will also continue to operate.

When the float has been released from the weight 2, the weight as a lesser load will continue to descend through the liquid with the arm 20 remaining in the position just described until the weight 2 comes in contact with the bottom of the tank. At this point, the entire tension on the pulley 18 will be released and the spring 22 will pull the lever 18 downward making contact between the arm 69 and the contact 88. The impulse counter circuit at this moment will be broken. The circuit however to the relay 51 will be closed as follows: From the ground connection 82 through the battery 11, the line 14, the line 90, the relay coil 51, the line 91, the contact 88, the contact arm 69, the line 79, the contact 89, the contact arm 71 to the ground 81. Since the relay coil 51 is energized, the contact arms 92 and 93 will be drawn to the left as well as the contact arms 59, 62 and 85. The swinging of the contact arms 59 and 62 from the contacts 58 and 63 to the contacts 94 and 95 respectively will reverse the direction of the current through the armature coils of the motor 32 and will therefore cause the drum 25 to rotate in the opposite direction and commence winding of the cable 3 upon the drum. Since the weight 2 will be lifted, the contact between the arm 70 and the contact 88 will be broken and would de-energize the relay coil 51, except for the fact that the making of the contact between the arm 92 and the contact 96 acts as a holding circuit through the line 97, the line 44, the contact arm 40 and the line 41 to ground. Even though therefore the weight 2 is raised, the motor will continue to operate to raise the weight 2 to the top of the tank from its initial position.

It will also be noted that as the weight 2 picks up the float 4 causing the arm 71 to be raised to the contact 72, the motor will still continue to operate. When however the limit arm 38 causes the contact arm 98 to make contact with the contact 99, then the release coil 100 will be energized by the battery 11 thus drawing down the armature 42 and releasing the switch arm 43 which will now swing over to the right and break the circuit to the relay coil 43 as well as to the relay coil 51. Opening the relay coil 43 permits the contact arms 46, 47 and 35 to swing to the right thus breaking the motor field circuit and also the motor armature circuit which thereupon causes the motor 32 to stop abruptly. The cable 3 will in this position be wound to its fullest extent and the circuit will be in condition for a repeated operation.

While the winding of the cable is taking place, a temperature indication may be noted by means of the self-balancing resistance bridge 10 for reading the temperatures. The arm 12 for this measurement should be moved to the position of the contact 101 whereby the temperature resistance 102 will be connected through the ground 103, over the line 104, the contact 85, the line 105, the contact 50, the switch arm 35 and the line 13 to the contact arm 12 through the meter 10 through the ground connection 83.

While the resistance thermometer is shown in the tank, it may also be outside of the tank or several resistance thermometers may be used connected in shunt, some outside of the tank and some in the tank for indicating an average temperature.

The self-balancing resistance bridge for reading the temperature should be of a standard type in which the necessary correction for the self-balancing in the circuit will indicate a temperature measurement.

Figure 2:
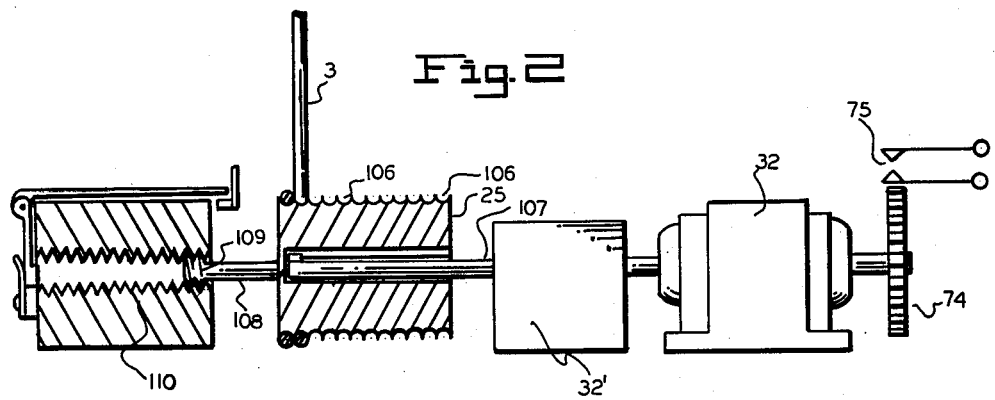
Figure 2 shows diagrammatically an arrangement of the detail for controlling the lowering of the weight in the tank.

In Figure 2 a variation of the arrangement of a detail of Figure 1 is shown. In order to obtain accuracy in measurement the cable or wire 3 must wind up on the drum in a known and consistent manner so that the length of each turn is the same. This is obtained in Figure 2 by moving the drum 25 laterally the space of a winding groove 106 which spirals on the drum 25. For this purpose, the drum 25 is rotated on the shaft 107 by the motor 32 while the drum has a coaxial extension 108 which has a threaded head or end 109 turning in a threaded tap 110. One turn of the shaft 108 will advance it laterally one thread in the tap so that the cable 3 will follow the groove 106 which has the same number of turns on the drum to the inch as that of the thread in the tap 110.

It will be noted upon consideration that for a drum of 12 inches in diameter, a length of cable of 50 feet will be wound up in about 16 turns. Assuming that a ⅛ inch cable is used 16 turns may be wound up on about a two inches long drum or less. The total length of cable which will be wound up is substantially equal to $L = N\pi D + W$: where D is the effective diameter of the drum; $W$ = a function of the length on the drum over which the turns extend; $N$ = number of turns to wind up the cable.

The number of turns necessary to wind up the entire cable will then be $$N = \frac{L-W}{\pi D}$$

and the length of cable wound up in each turn is equal to $$\frac{L\pi D}{L-W}$$

The number of impulses required for a measurement on the basis of $\frac{1}{10}$ of an inch will therefore be $$10\frac{L\pi D}{L-W}$$

If the values as set forth are substituted in this formula, it will be seen that the wheel 74 will have to produce about 400 impulses for each rotation of the drum 25. It may be difficult to put 400 projections or pins on the wheel 74, but this is not necessary since it is preferable to drive the drum 25 through a reduction gear 32' of a ratio of 1 to 10 or greater, in which case, the same reduction ratio would apply to the impulse wheel 74. On the basis of 1 to 10 ratio, the impulse wheel 74 would only need approximately 40 projections spaced equally apart and if the ratio was greater, that is if the drum was rotated even more slowly than the motor 32, then it would be necessary to produce less pulses for the impulse generator. The applicant has obtained an accuracy of measurement to a tenth of an inch with apparatus of the present invention.

The applicant has also determined that the float mechanism will also operate sharply and with extreme accuracy requiring only initial adjustment upon installation.

Figure 3:
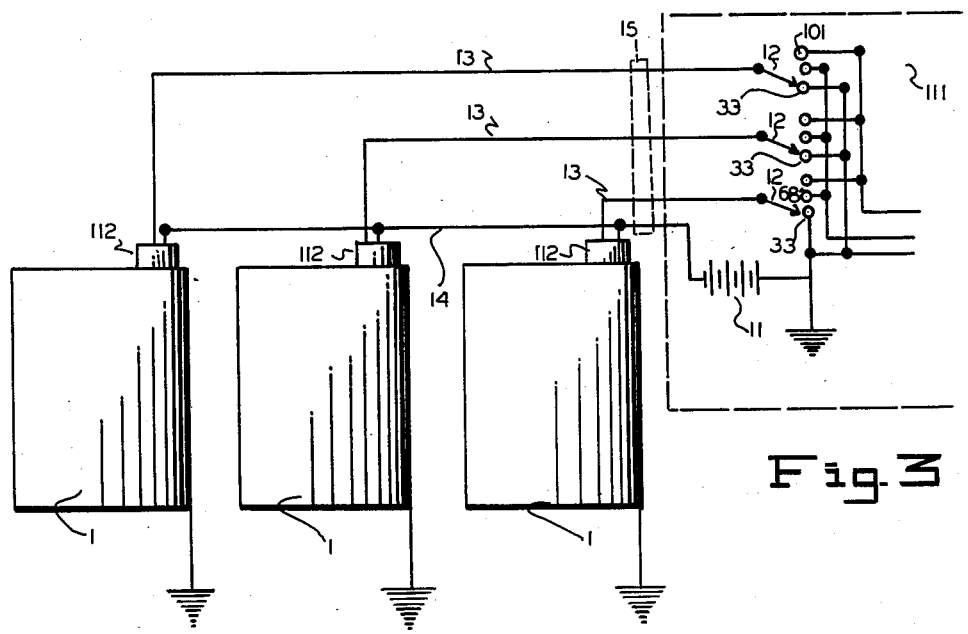
Figure 3 shows a general lay-out of the tank farm and measuring circuit.

In Figure 3, a layout is shown using three tanks, 1, 1, 1 with the observing station 111 having its cable 15 in which the individual lines 13, 13, 13 and the ground 14 go to the various tanks making up the farm. The common battery 11 will serve for energizing all of the systems in the same way that the battery 11 acts in Figure 1. A local energizing source 77 will of course be necessary within the housing 112 or near it for providing the energy for the impulse generator as described in connection with Figure 1. Observation may be made on any of the tanks simply by positioning one of the selector switches 12, 12, 12 corresponding to the tank which is being observed. The system of making measurements is as has been described in connection with the arrangement of Figure 1. Immediately upon closing the proper relays by momentarily placing the contact arm 12 on one of the lower contacts 33, the arm 12 is shifted to the contact 68 and complete measurement of the depth of oil or liquid in the tank and also the space from the top of the tank to the level is obtained. Shifting the arm 12 to one of the top contact group 101, it is possible to obtain the temperature reading as has been described. This shift, however, should not take place until after the weight 2 starts to rise from the bottom of the tank.

It will be noted that the description of Figure 1 has been given with the switch S closed. If the switch S is allowed to remain open then auxiliary impulses will not be generated and recorded on the indicator 10 until the switch 31 is closed by the lowering of the weight and the motion of the arm 30 to the right as viewed in Figure 1. The switch arm 31 and its contact may be adjusted so that the pulses will begin to click off with the weight 4 in a definitely chosen position. The exact measurement to the liquid level corrected by a known and constant factor will give the amount gone from the tank or the ullage. Since the height of the tank from the bottom to the known positions at which the pulses are created is itself known, then this will be a check on the total measurement made by the pulses on the indicator 8.

Figure 4:
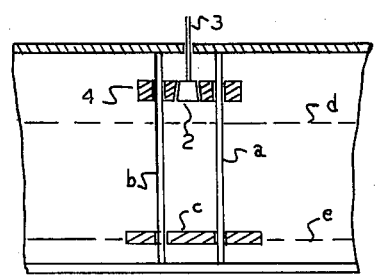
Fig. 4 shows a modification of a detail.

The arrangement shown in Figure 1 may also be used to measure distances between different levels in separable liquids. In Figure 4, there is shown a tank which carries a heavier liquid such as water at the bottom and a lighter liquid such as oil on top of it.

The weight 2 and the float 4 in Figure 4 are the same as in Figure 1 with the addition that float 4 is maintained in position by guides a and b so that the line 3 descends through the opening in the float 4 as the weight 2 is lowered through the oil surface d. The guides a and b also hold in position an interface float c which rises or falls with the level of the water e so that it is always at the interface surface. When the weight 2 reaches the float c, it becomes substantially relaxed comparable to coming on contact with the bottom of the tank 1 in Figure 1.

In the operation of Figure 4 when the weight and float reach the oil level, the same indications begin as when the weight and float reach the water level in Figure 1 and these indications cease when the interface float is reached.

The present arrangement may serve in various other capacities also. Where the surface 5 in Figure 1 is a solid as in a grain elevator or a frozen river, the entire weight on the line 3 will at once be relieved and the auxiliary measurement from a fixed point to the level of the grain, ice, or other material is measured. Thus a measure of the amount of grain in an elevator or the ice level in a river may be made from a remote point. The device may also be used to measure the level of water in rivers from a remote point to provide means of measuring water rises in flood controls and for other purposes. Here too the measurement from a fixed point to the liquid level is important, which is the auxiliary or first reading in the present system.

Having described my invention, I now claim:

1. A system for measuring the depth of fluid from the fluid levels in tanks from a remote point therefrom comprising a line having a weight suspended therefrom, a drum on which said line is wound, means for rotating said drum to lower the weight in the tank, electrical means for measuring the distance in said tank through which said weight is lowered, means commencing the operation of said measuring means when said weight enters the fluid in the tank and continuing the measurement of the depth of the fluid as the weight progresses therethrough corresponding to the amount of line which has been payed out.

2. A system for measuring the depth of liquid in a tank comprising a weight, means for lowering said weight from a position above the liquid level into the liquid, an electrical measuring means having a measuring indicator remote from the tank, means actuated upon the entrance of the weight into the liquid to commence the operation of the measuring means and said measuring indicator for measuring the descent of the weight into the liquid, and electrical means actuated when the weight comes to rest at the bottom of the tank to terminate the operation of measurement.

3. A system for measuring the depth of liquid in a tank comprising a weight, means for lowering said weight from a position above the liquid level into the liquid, an electrical measuring means having a measuring indicator remote from the tank, electrical means actuated by the change of tension on the lowering means upon the entrance of the weight into the liquid to commence the operation of the measuring means and said measuring indicator and thereby provide remotely a measurement of the distance which the weight descends into the liquid.

4. A system for measuring the depth of liquid in a tank comprising a weight, means for lowering said weight from a position above the liquid level into the liquid, a measuring means, means actuated by the change of tension on the lowering means upon the entrance of the weight into the liquid to commence the operation of the measuring means and provide a measurement of the distance which the weight descends into the liquid, and means operable when the weight rests on the bottom to terminate the measurement and initiate the return of the weight to its initial position.

5. A system for measuring the depth of liquid in a tank from a point remote therefrom comprising a line with a weight at its end mounted for lowering into the liquid of the tank, an electric motor and drum driven thereby upon which said line is wound, electrical means controlled by the operator at a remote point for commencing the operation of said motor for lowering the weight in the tank, electrical measuring means at said remote point for measuring the amount of line payed out in lowering the weight through the liquid and electrical means operable in connection with said measuring means by the decrease in tension on the line when the weight comes in contact with the liquid for initiating the operation of said measuring means.

6. A system for measuring the depth of liquid in a tank from a point remote therefrom comprising a line with a weight at its end mounted for lowering into the liquid of the tank, an electric motor and drum driven thereby upon which said line is wound, electrical means controlled by the operator at a remote point for commencing the operation of said motor for lowering the weight in the tank, electrical measuring means for measuring the amount of line payed out in lowering the weight through the liquid, having an indicator operative in connection therewith at said remote point, means operable by the decrease in tension on the line when the weight comes in contact with the liquid for initiating the operation of said measuring means, and said indicator and means operable upon the release of tension in the line when the weight has reached the bottom of the tank for stopping the operation of the measuring means and causing a rewinding of the line.

7. A system for measuring the depth of liquid in a tank from a point remote thereof comprising a line with a weight at its end mounted for lowering into the liquid of the tank, a motor and drum upon which said line is wound, means controlled by the operator at a remote point for commencing the lowering of the weight in the tank, measuring means for measuring the amount of line payed out in lowering the weight through the liquid, means operable by the decrease in tension on the line when the weight comes in contact with the liquid for initiating the operation of said measuring means, means operable upon the release of tension in the line when the weight has reached the bottom of the tank for stopping the operation of the measuring means and causing a rewinding of the line and means operated when the line has been wound to its initial position for stopping the winding means and returning the system to normal preoperative conditions.

8. A system for measuring the depth of liquid in a tank from a point remote therefrom comprising a line having a weight at its end with a float freely supported thereon, electric motor means for lowering the weight with its float from a given position in the top of the tank to and through the liquid thereof including a pivoted balance arm having a pulley supported on one side of the pivot over which the line passes and switching means mounted on the other side of the pivot having elements operative at different positions of the balance of the arm, an electric depth measuring device having an indicator at said remote place and electric means actuated by the decrease in tension on the line when the float floats for commencing the measurement of the electric depth measuring device and its indicator as the weight descends through the liquid.

9. A system for measuring the depth of liquid in a tank from a point remote therefrom comprising a line having a weight at its end with a float freely supported thereon, electric motor means for lowering the weight with its float from a given position in the top of the tank to and through the liquid thereof including a pivoted balance arm having a pulley supported on one side of the pivot over which the line passes and switching means mounted on the other side of the pivot having elements operative at different positions of the balance of the arm, an electric depth measuring device having an indicator at said remote place including means for indicating the length of line being payed out and electric means actuated by the decrease in tension on the line when the float floats for commencing the measurement of the liquid depth by said electric depth measuring device.

10. A system for measuring the depth of liquid in a tank from a point remote therefrom comprising a line with a weight including a releasable surface float at its end mounted for lowering into the liquid of the tank, an electric motor and drum driven thereby upon which said line is wound, a liquid depth measuring device having indicating means at said remote point and including means for creating spaced electric impulses corresponding to an integration of the length of line being payed out, counter means operative by said impulses for indicating the length of line being payed out and electrical switching means operative by the release of said surface float for causing said indicating means to begin to operate.

11. A system for measuring the depth of liquid in a tank from a point remote thereof comprising a line with a weight at its end mounted for lowering into the liquid of the tank, a motor and drum upon which said line is wound, a fluid depth measuring device including means for creating spaced electric impulses corresponding to an integration of the length of line being payed out, counter means operated by said impulses, means operative when said line is begun to be payed out for initiating the operation of said counter means for indicating the length of line being payed out, a second counter means operated by said impulses, means operated when said weight enters the liquid for initiating the operation of said second counter means for indicating the length of line payed out in said liquid.

12. A system for indicating at a central point a measurement of a liquid level at a remote point comprising a weight suspended at said remote point above the liquid level, means controlled at the control point for lowering said weight to the liquid level, electrical impulse means for generating impulses as a function of the distance the weight is lowered and for indicating at said central point the distance the weight is lowered from a given reference point above the liquid to the liquid and electrical means operated when the weight enters the liquid for separately indicating the distance the weight is lowered into the liquid.

13. A system for indicating at a central point a measurement of a liquid level at a remote point comprising a weight suspended at said remote point above the liquid level, means controlled at the central point for lowering said weight to the liquid level, electrical impulse means for generating impulses as a function of the distances the weight is lowered and means for indicating at said central point the distance the weight is lowered from a given reference point above the liquid to the liquid, electrical means operated when the weight enters the liquid for separately indicating the distance the weight is lowered into the liquid including means positioned at said remote point for indicating the depth to the bottom of the liquid.

14. A system for indicating at a central point a measurement of a liquid level at a remote point comprising a weight suspended at said remote point above the liquid level, means controlled at the central point for lowering said weight to the liquid level, means for producing electrical pulses corresponding to small units of distance through which the weight is lowered, means indicating means responsive to said impulses for integrating the sum of said small units, a second indicating means responsive to said impulses for integrating said small units and means operative when the weight comes in contact with the liquid for commencing the operation of said second indicating means.

15. A system for indicating at a central point a measurement of a liquid level at a remote point comprising a weight suspended at said remote point above the liquid level, means controlled at the central point for lowering said weight to the liquid level, means for producing electrical pulses corresponding to small units of distance through which the weight is lowered, indicating means responsive to said impulses for integrating said small units, a second indicating means responsive to said impulses for integrating said small units and means operative when the weight comes in contact with the liquid for commencing the operation of said second indicating means and means for discontinuing the production of said pulses when the bottom of the liquid is reached.

PHILIP N. SMITH.

REFERENCES CITED

The following references are of record in the file of this patent:

UNITED STATES PATENTS

| Number | Name | Date |
|---|---|---|
| 1,009,856 | Rattray | Nov. 28, 1911 |
| 1,094,763 | Waite | Apr. 28, 1914 |
| 1,126,554 | Murray | Jan. 26, 1915 |
| 1,851,195 | Leilich | Mar. 29, 1932 |
| 2,265,736 | Larson | Dec. 9, 1941 |
| 2,364,346 | Dice | Dec. 5, 1944 |
| 2,432,727 | Crothers et al. | Dec. 16, 1947 |